United States Patent
Kumar et al.

(10) Patent No.: US 11,244,150 B2
(45) Date of Patent: Feb. 8, 2022

(54) FACIAL LIVENESS DETECTION (71) Applicant: BHARTI AIRTEL LIMITED, New Delhi (IN)

(72) Inventors: Anant Kumar, Gurgaon-Haryana (IN); Bhupendra Niranjan, Gurgaon-Haryana (IN); Shivang Bharadwaj, Gurgaon-Haryana (IN)

(73) Assignee: BHARTI AIRTEL LIMITED, New Delhi (IN)

( * ) Notice: Subject to any disclaimer, the term of this patent is extended or adjusted under 35 U.S.C. 154(b) by 0 days.

(21) Appl. No.: 16/810,592

(22) Filed: Mar. 5, 2020

(65) Prior Publication Data
US 2021/0073518 A1  Mar. 11, 2021

(30) Foreign Application Priority Data
Sep. 10, 2019 (IN) .............................. 201911036279

(51) Int. Cl.
*G06K 9/00* (2006.01)
*G06N 20/10* (2019.01)

(52) U.S. Cl.
CPC ..... *G06K 9/00288* (2013.01); *G06K 9/00234* (2013.01); *G06K 9/00261* (2013.01); *G06K 9/00906* (2013.01); *G06N 20/10* (2019.01)

(58) Field of Classification Search
CPC ........... G06K 9/00288; G06K 9/00906; G06K 9/00261; G06K 9/00234; G06K 9/6271; G06K 9/00228; G06K 9/00281; G06K 9/4652; G06K 9/0061; G06K 9/00671; G06K 9/00268; G06K 9/00577; G06K 9/00664; G06K 9/00604; G06K 9/00617; G06K 9/4671; G06K 9/00073; G06K 9/3233; G06K 9/6202; G06K 9/6215; G06K 9/00006; G06K 9/00315; G06K 9/00335; G06K 9/6267; G06K 9/627; G06K 9/00369; G06K 9/00375; G06K 9/2018; G06N 20/10; G06F 21/32; G06F 3/013; G06F 3/017; G06F 3/011; G06F 2221/2117; H04L 63/0861; H04L 67/12; H04L 9/3231; H04L 63/0428; H04L 63/061; H04L 63/0853; H04L 2463/082; H04L 63/10; G06T 11/60; G06T 7/60; G06T 7/70; G06T 13/40; G06T 15/10; G06T 2207/30201; G06T 7/11; G06T 2207/10016; G06T 2207/20084; G06T 1/00; G06T 1/0007; G06T 2207/10004; G06T 2207/10024;
(Continued)

(56) References Cited

U.S. PATENT DOCUMENTS

2007/0147510 A1 * 6/2007 Asad .................... H04N 19/186
                                                    375/240.18
2009/0046170 A1 * 2/2009 Linzer .................... H04N 9/045
                                                    348/222.1

(Continued)

*Primary Examiner* — Nimesh Patel
(74) *Attorney, Agent, or Firm* — Cozen O'Connor (57) ABSTRACT

Approaches for processing captured image to detect facial portion of a user within the captured image are described. In an example, a facial image from the processed captured image may be derived. Based on the derived facial image, determining a set of specular features and texture-based feature vector. Based on the specular features and the texture-based feature vector, whether the facial image is of a facial substitute or not may be ascertained.

12 Claims, 4 Drawing Sheets

(58) Field of Classification Search
CPC . G06T 2207/20021; G06T 2207/20024; G06T 2207/20172; G06T 3/00; G06T 3/0012; G06T 3/4046; G06T 5/00; G06T 7/0012; G06T 7/194; G06T 7/20; G06T 7/33; G06T 7/90; G06T 9/20
See application file for complete search history.

(56) References Cited

U.S. PATENT DOCUMENTS

| | | | |
|---|---|---|---|
| 2010/0007665 A1* | 1/2010 | Smith | G06T 13/40 345/473 |
| 2016/0094823 A1* | 3/2016 | Zhai | H04N 9/646 348/453 |
| 2016/0234023 A1* | 8/2016 | Mozer | H04L 63/0861 |
| 2016/0286080 A1* | 9/2016 | Hayashi | G06T 7/194 |
| 2018/0060648 A1* | 3/2018 | Yoo | G06K 9/00899 |
| 2018/0239955 A1* | 8/2018 | Rodriguez | G06F 21/32 |
| 2019/0180085 A1* | 6/2019 | Wen | G02B 5/208 |

* cited by examiner

FACIAL LIVENESS DETECTION

TECHNICAL FIELD

The present subject matter relates to approaches for liveness detection of a face being captured within an image for purposes of authentication and identification.

BACKGROUND

Access to computing devices may be permitted on the basis of an authentication mechanism. Modern devices have now begun utilizing facial recognition as one such authentication mechanisms. In such a case, the computing device may be positioned with respect to the face of the authorized individual. Based on the identification of the user, access to the computing device may be permitted. In certain cases, individuals other than the authorized users may seek to circumvent such authentication mechanisms by using an image, such as physical photograph, electronic image, etc., of the authorized user to spoof the device into permitting access. Hence it is important for authentication systems to distinguish between the actual user and one pretending to be the user. To such an end, appropriate authentication measures need to be implemented to prevent spoofing.

BRIEF DESCRIPTION OF THE DRAWINGS

The detailed description is described with reference to the accompanying figures. It should be noted that the description and figures are merely examples of the present subject matter and are not meant to represent the subject matter itself.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings

DETAILED DESCRIPTION

In user verification system, a computing device may determine whether to allow user access computing devices based on the verification information provided by the user. Verification method may include, either be through a username and password, or may be based on authentication of a biometric input provided by user. Examples of such biometric information may include, but not limited to, fingerprint, face of user, iris scan and such.

With recent development in computing devices, facial recognition technology is now being used to perform such authentications based on which access to the computing device may be permitted. Facial recognition, amongst other aspects, provide a more robust mechanism for authentication and is not subject to deficiencies of other authentication mechanism (such as loss of password, etc.). In addition, facial recognition provides ease in using the system wherein the authentication as compared to password-based techniques.

Facial recognition-based authentication mechanism may also be prone to tampering and may be compromised through spoofing using a photograph or an electronic image of the face of the authorized user. Photographs may probably be considered as the most common sources of spoofing attacks since they may be captured discretely without the knowledge of the authorized user, or may even be obtained from social media platforms, where such images may be uploaded. To such an end, various techniques exists which intend to detect liveness of the face based on which the authentication is sought. Such mechanisms are able to ascertain whether the image being captured is that of another image or of the face of the authorized user.

Generally, liveness detection of an image of the face may involve detecting one or more physiological motions or indications, such as blinking of the eyes, eye movement, changes in facial expression, etc. However, such approaches require active involvement and efforts from the user which may be discourage the user from relying on facial recognition-based authentication. Other examples may involve performing authentication based on other types of biometric inputs along with facial recognition, but such approaches may have their own challenges and may tend to limit the effectivity of facial recognition as a primary authentication mechanism.

Approaches for detecting liveness of a face are described. As would be understood, liveness may be considered as a determination which is to ascertain the facial capture being provided as a biometric input correspond to the actual face of the authorized user and not based on an image of the authorized user. The present approaches provide an authentication mechanism which is robust, computationally swift and non-intrusive to detect face spoofing attacks which rely on recaptured images of the face of an authorized user. In one example, an image including a face of the authorized user is obtained. The obtained image may be further processed to identify portions of the image which may include the face of a user. Once the portion of the image bearing the face of the user is determined, one or more specular reflection components may be determined. As would be understood, specular reflection components may be used to determine whether light being captured by an image sensor is reflecting off a planar surface (e.g., a photograph) or is reflected off from the face of a user. In addition to the specular reflection components, one or more texture-based components may also be determined based on the image under consideration. In an example, the texture-based components may be represented through Local Binary Patterns.

The specular reflection components and the texture-based components may be further concatenated and further assessed to determine whether the facial traits under consideration have been obtained from an actual face of the user or have been obtained from an image of the face of the user. Once it is ascertained that the facial capture being provided are based on actual face of the user, a further authentication may be performed to determine whether the user is an authorized user or not. In an example, ascertaining whether the facial capture correspond to the face of the user is performed through a computing device implementing a support vector machine. It would be pertinent to note that determining components based on both specular reflection and texture-analysis provide a computationally efficient and swift method for face liveness detection.

These and other aspects are further described in conjunction with the accompanying figures FIGS. 1-X. The above examples are further described in conjunction with appended figures. It should be noted that the description and figures merely illustrate the principles of the present subject matter. It will thus be appreciated that various arrangements that embody the principles of the present subject matter, although not explicitly described or shown herein, may be devised from the description and are included within its scope. Moreover, all statements herein reciting principles, aspects, and examples of the present subject matter, as well as specific examples thereof, are intended to encompass equivalents thereof. In the figures, the left-most digit(s) of a reference number identifies the figure in which the reference number first appears. The same numbers are used throughout the figures to reference like features and components.

Figure 1:
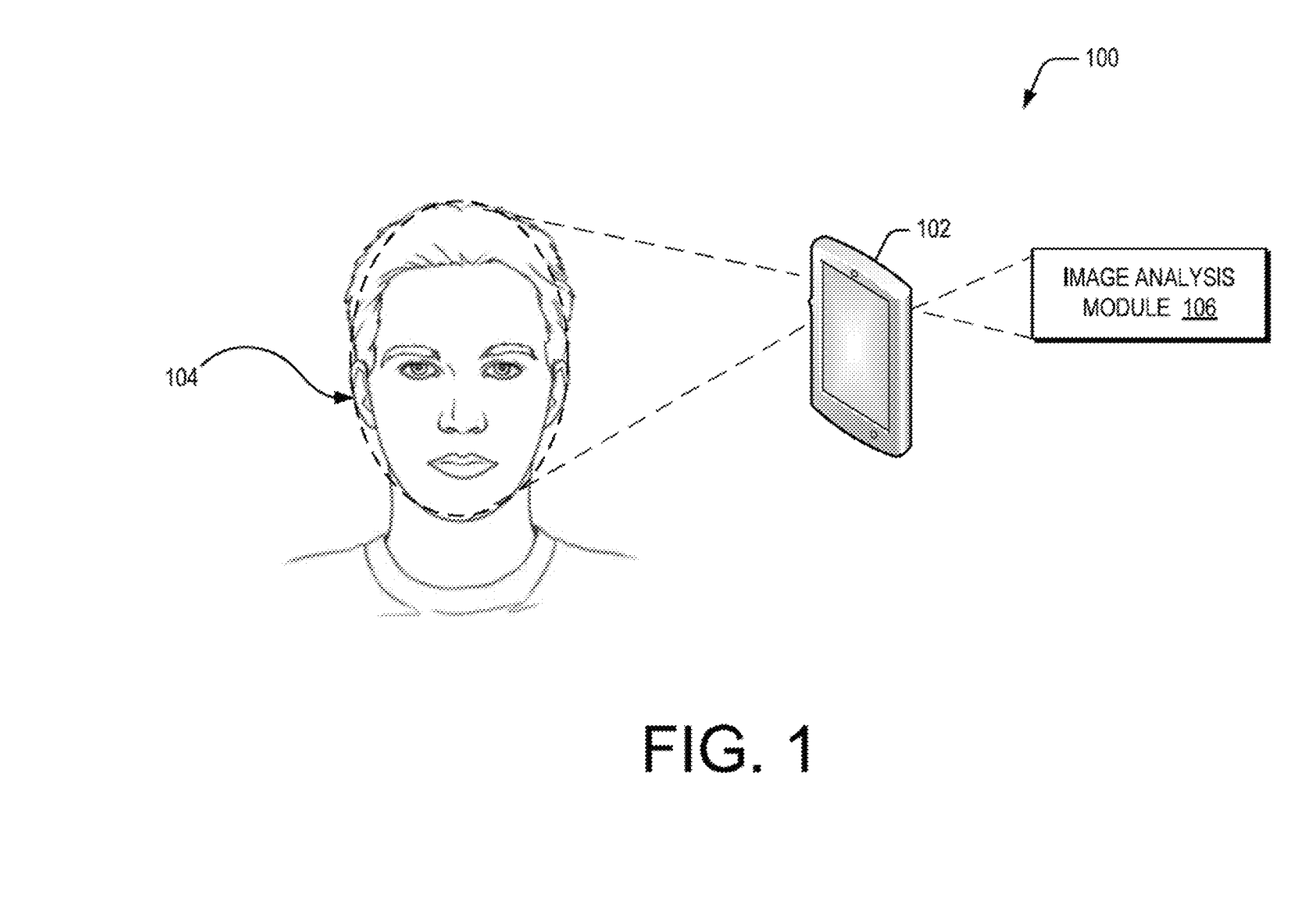
FIG. 1 is a diagram of an example setup in which the system detects user via facial detection module.

FIG. 1 illustrates an exemplary environment 100. The environment 100 may further include a computing device 102 which implements facial recognition for authenticating and verifying the identity of a user 104. As would be understood, the computing device 102 may include any device comprising a processor-based resource, with such a computing device 102 being in a position to implement one or more functions based on execution of plurality of instructions which may be stored within the memory of the computing device 102. Examples of such a computing device 102 include, but are not limited to, laptops, mobile phones, palmtops, and tablet PCs. It may be noted that even though the present figure is depicting the computing device 102 as a smartphone, any other example may be used without deviating from the scope of the present subject matter.

Returning to the present example, the computing device 102 may further include an image analysis module 106. Amongst other things, the image analysis module 106 may examine one or more facial capture which have been captured by the computing device 102. The image analysis module 106 may then ascertain whether the facial capture so determined have been obtained from a photograph of the user 104 or has been obtained from the physical face of the user 104. To this end, the computing device 102 may capture an image which includes an image of the face of the user 104. The image analysis module 106 may process the captured image to detect whether any portion of the captured image includes a face. Once a face is detected within the image, the portion of the image bearing the face may be further processed to determine one or more specular features for the image portion. In an example, the specular features may be represented through a specular reflection gradient histogram.

While the specular features are being determined, the image analysis module 106 may further process the image portion to determine one or more texture-based features. In one example, the texture-based features may be represented through a histogram generated based on technique based on Local Binary Patterns. Once determined, the image analysis module 106 may concatenate the specular features and texture-based features may be further concatenated to provide a consolidated feature set. The consolidated feature set may be subsequently analyzed to ascertain whether the facial capture obtained by the computing device 102 is in fact from a photograph or from any other facial substitute. In an example, the image analysis module 106 may ascertain whether the facial capture thus obtained is of the actual face of the user 104 or is from another facial substitute of the user 104. It may be noted that the facial substitute may include, but need not be limited to, a photograph, a digital image or video depicting the face of the user 104.

Figure 2:
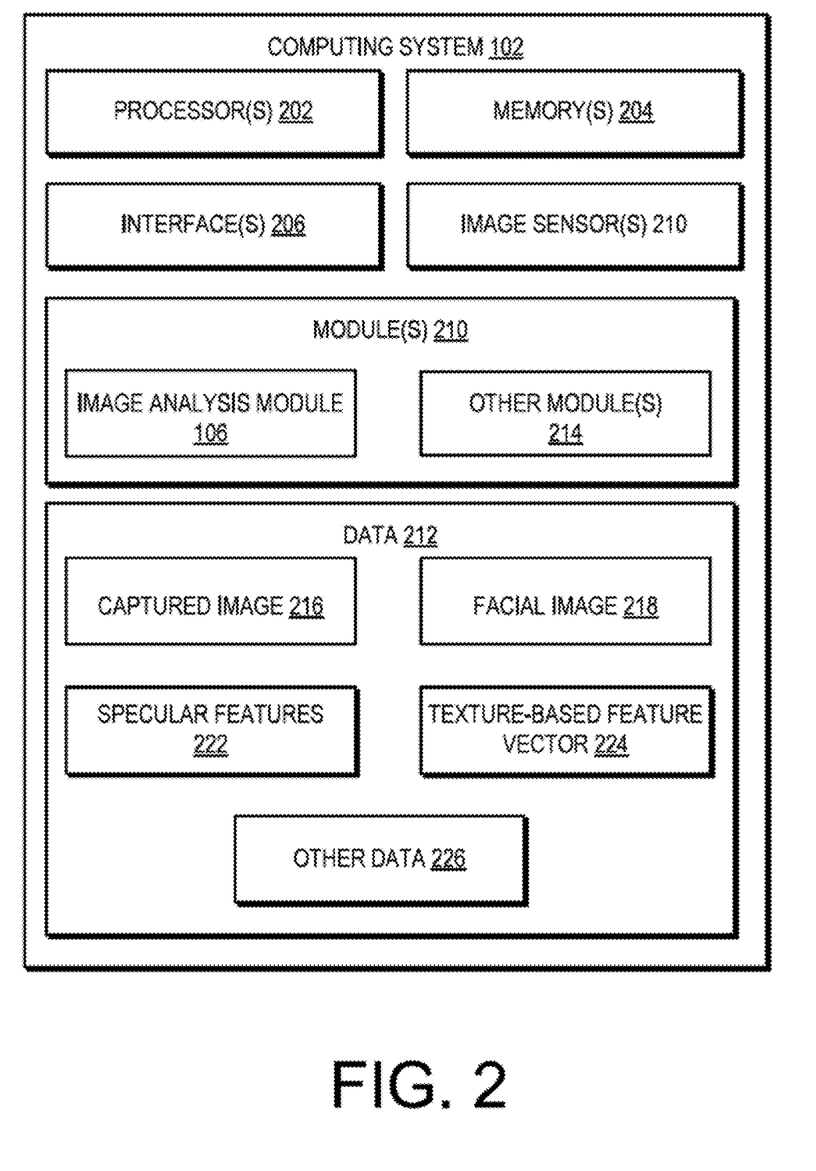
FIG. 2 is a block diagram of an example facial detection system for detecting facial portion of image.
Figure 3:
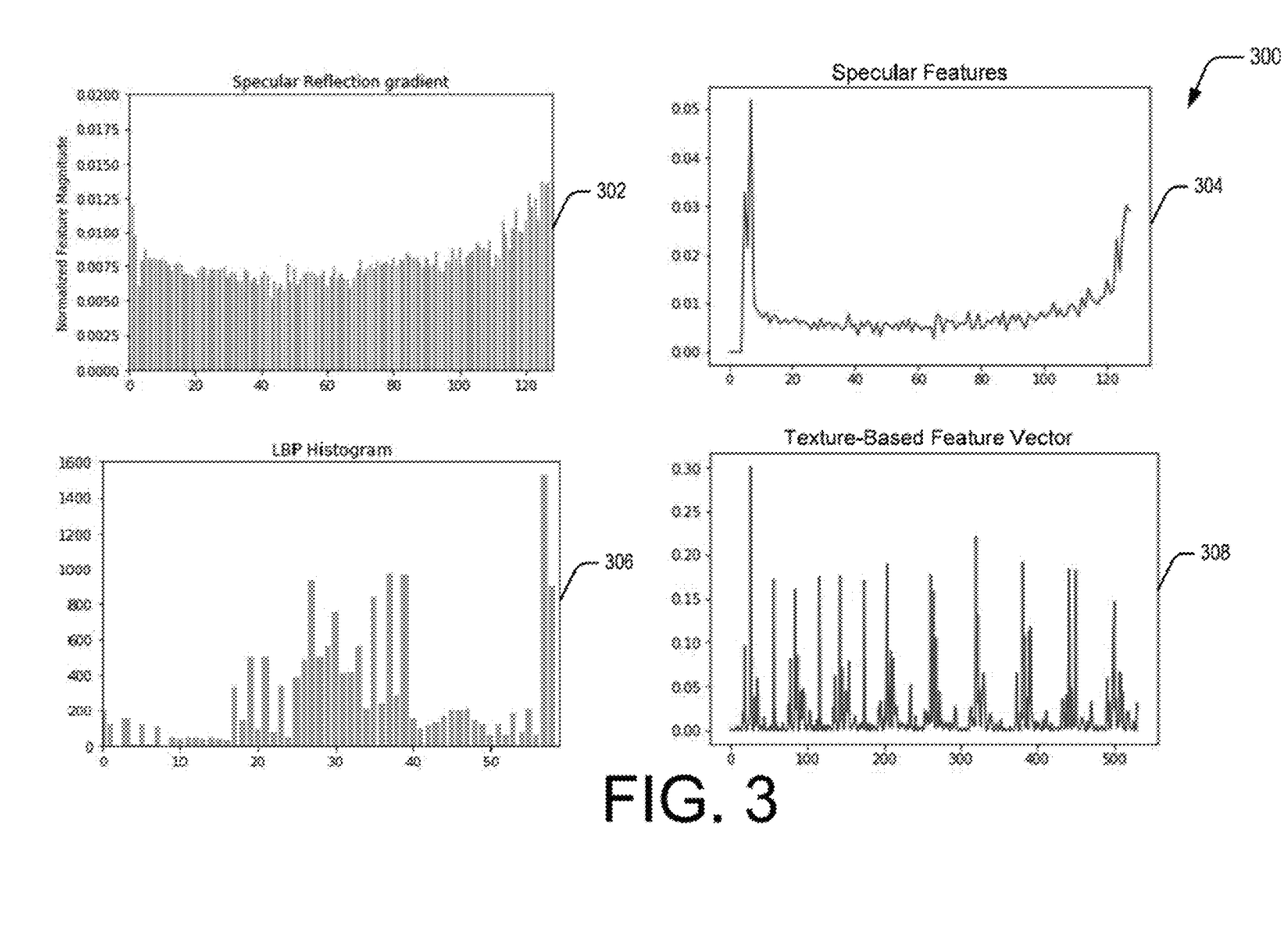
FIG. 3 provides an illustrative graphs pertaining to various features pertaining to the facial portion of the image, as per one example of the present subject matter.

FIG. 2 describes the present subject matter in a more elaborated manner in conjunction with FIG. 3. FIG. 2 illustrates a computing device 102 as per one example of the present subject matter. In the present example, the computing system 102 include processor(s) 202, memory 204, and interface(s) 206. The processor(s) 202 may also be implemented as signal processor(s), state machine(s), and/or any other device or component that process image based on operational instructions. The interface(s) 206 may include a variety of interfaces, for example, interfaces for data input and output data. The computing device 102 may further include an image sensor(s) 208. The image sensor(s) 208 may be a series or an array of sensors which may be used to capture either a still image, series of images or a video of the ambient environment towards which the computing device 102 may be directed towards. In an example, the image sensor(s) 208 may be positioned on the body of the computing device 102 in such a manner such that the face of the user 104 would be within the capturing field of the image sensor(s) 208. The image sensor(s) 208 may either be integrated within the electronic circuitry of the computing device 102 (e.g., a primary camera or secondary camera of a smartphone) or may be externally coupled with the computing device 102 (e.g., web camera coupled to a laptop or a desktop).

The interface(s) 206 may be such that they enable interconnection or communication of the computing device 102 with one or more other devices. The communication between such devices may be enabled through a wired or a wireless network. The network may be a private network or a public network and may be implemented as a wired network, a wireless network, or a combination of a wired and wireless network. The network may also include a collection of individual networks, interconnected with each other and functioning as a single large network, such as the Internet. Examples of such individual networks include, but are not limited to, Global System for Mobile Communication (GSM) network, Universal Mobile Telecommunications System (UMTS) network, Personal Communications Service (PCS) network, Time Division Multiple Access (TDMA) network, Code Division Multiple Access (CDMA) network, Next Generation Network (NGN), Public Switched Telephone Network (PSTN), Long Term Evolution (LTE), and Integrated Services Digital Network (ISDN).

Returning to the present implementation, the computing device 102 may further include module(s) 210 and data 212. The module(s) 210 may be implemented as a combination of hardware and programming (e.g., program instructions) to so implement one or more functionalities of the module(s) 210. In one example, the module(s) 210 consists of image analysis module 106 and other module(s) 214. The data 212 may further include captured image 216, facial image 218, specular features 222, texture-based feature vector 224 and other data 226. The other data 224 may include data that is either utilized by the module(s) 210 or may include data that is generated by execution of such module(s) 210.

In relation to the operation of the computing device 102, a user, say user 104 may position the computing device 102 for initiating the authentication process in order gain access to the computing device 102. In an example, the authentication process may be based on either an input from a user or may be initiated automatically based on the detection on action or gesture from the user 104. For example, the authentication process may commence on detecting a specific motion executed by the computing device 102, which may typically occur when the user 104 may move and hold the computing device 102 in front of their face, in a vertical position.

Continuing with the present example, once the authentication process is initiated, the image sensor(s) 208 may capture an image. The captured image may be stored within the computing device 102 as captured image 216. The captured image 216 may be further processed by the image analysis module 106 to determine whether the captured image 216 includes a facial portion of an individual. The detection of the facial portion within the captured image 216 may be based on variety of techniques. For example, the detection of the facial portion from the captured image 216 may be performed using edge detection technique. In another example, the portion of the image which includes the face may be determined based on mechanisms which employ a support vector machine.

Once it is determined that the captured image 216 includes a face, the captured image 216 may be cropped to isolate the portion which bears the face. The cropped image, stored as facial image 218, may be further processed before one or more features corresponding to the facial image 218 are determined. In an example, the facial image 218 may be aligned and scaled. To this end, the image analysis module 106 may detect the position of the eyes within the facial image 218. Once the position of eyes is determined, the image analysis module 106 may provide a notional line passing through the eyes of the facial image 218. The orientation of the facial image 218 may be further adjusted such that the notional line passing through the eyes is aligned with respect to predefined reference. Once aligned, the facial image 218 may be scaled such that the interocular separation between the eyes of the facial image 218 is a predefined value and that the eyes are at a predefined distance from the certain points of references within the facial image 218. Once the scaling is performed, the facial image 218 may be resized to a defined size. In an example, the facial image 218 may be resized to a 128*128 RGB image.

Continuing with the present example, the image analysis module 106 may further process the facial image 218 in order determine one or more specular features pertaining to the facial image 218. As is generally understood, specular features corresponding to an image for the same facial construction differ when the image corresponds to an actual face as opposed and when the image corresponds to a facial substitute (e.g., a photograph) of the user. The difference typically arises since the specular reflection from a flat surface (e.g., surface of a facial substitute) is different from the specular reflection which occurs from the contours of an actual or physical face.

In an example, for obtaining the specular features, the image analysis module 106 may convert the facial image 218 (which is in the RGB color space) to the YUV color space. Once the conversion of the facial image 218 is completed, the image analysis module 106 may separate the Y channel corresponding to the facial image 218 in the YUV color space. In another example, the Y channel may be further separated and normalized. The image analysis module 106 may then perform a histogram normalization onto the normalized Y channel of the facial image 218. As would be understood, histogram normalization may be considered to enhance fine detail within an image, such as the facial image 218. The normalized Y channel may be further subjected to an intensity transformation function to provide a transformed Y channel value. Thereafter, the image analysis module 106 may subtract the transformed Y channel value from a corresponding normalized Y channel value which to obtain a series, which may then be collected into a 128-bin histogram to provide the specular features in the form of a specular reflection gradient histogram 302. It may be noted that the present example is only illustrative and should not be considered as limitation. Other approaches for determining the specular features may also be relied. Such approaches would also be within the scope of the present subject matter. In one example, the image analysis module 106 on determining the specular features may store them as specular features 222.

With the determination of the specular features, one or more texture-based features may then be obtained. It may be noted that the determination of the texture-based features is not dependent on the determination of the specular features. The texture-based features may be determined prior to or in parallel with the determination of the specular features, without deviating from the scope of the present subject matter.

Returning to the present example, the image analysis module 106 may further process the facial image 218 to determine one or more texture-based features. In an example, the image analysis module 106 may rely on a local binary pattern-based algorithm for determining the texture-based features. To this end, the image analysis module 106 may retrieve the facial image 218 and covert into a grayscale image. Once the grayscale version of the facial image 218 is obtained, the image analysis module 106 may apply a local binary pattern (LBP) function onto the grey-scaled facial image 218. As would be commonly understood, the LBP function when applied onto an image provide a LBP-based feature vector.

An LBP feature vector may be generated by initially dividing an image, e.g., the facial image 218, into a number of cell. For the purposes of the present description, a cell of about 3*3 pixels is determined. The number of pixels in a cell may vary. Once the cell is determined, the image analysis module 106 may further compare a central pixel value with each of the neighbouring pixels. The comparison of the central pixel value with the each of the neighbouring pixel is captured by the image analysis module 106 as a binary value corresponding to the LBP cell. For example, a 1 may indicate that the central pixel value is greater than the neighbouring pixel value and a 0 may indicate the opposite. Based on the binary value of the LBP cell, the image analysis module 106 may calculate the LBP histogram 306. In an example, the LBP histogram 306 may be normalized by the image analysis module 106. The LBP histogram 306 for all cells composing the facial image 218 are then further consolidated to provide the texture-based feature vector 224. It may be appreciated that the texture-based feature vector 224 determined through LBP functions is only one of the many other possible examples that may be utilized for determining the texture-based feature vector 224. Such other approaches, too, fall within the scope of the present subject matter.

Once the specular features 222 and the texture-based feature vector 224 are obtained, the image analysis module 106 may concatenate them to obtain a final feature vector 226. The final feature vector 226 may be further assessed by the image analysis module 106 to determine whether the facial image 218 corresponds to an actual face or that it is obtained from another facial substitute of the user 104. In an example, the image analysis module 106 may rely on a support vector machine classifier for performing the assessment based on the specular features 222 and the texture-based feature vector 224.

On determining that the facial image 218 is based on a facial substitute of the user 104, the authentication process initiated by the computing device 102 may be terminated. However, on determining that the facial image 218 does in fact correspond to an actual face of the user 104, a facial recognition may be performed to authenticate the identity of the user 104. If the user 104 is determined to be an authorized user, access to the computing device 102 may be provided.

The above described approaches may be used to determine whether the facial image 218 under consideration is based on actual face of the user 104 or has been obtained from another facial substitute of the user 104. As would be noted, the present approaches rely on specular features 222 as well as texture-based feature vector 224 for the aforesaid determination.

FIG. 3 illustrate various plots and histogram profiles generated by processing the facial image 218. The image analysis module 106 may process the facial image 218 to determine one or more texture-based features. In one example, the image analysis module 106 extract specular features of the facial image 218 in the form of a specular reflection gradient histogram 302. The specular reflection gradient histogram 302 for all cells composing the facial image 218 are then further consolidated to provide the specular features 304. In another example, image analysis module 106 relies on a local binary pattern-based algorithm for determining the texture-based features. The local binary pattern-based algorithm extracts the texture-based features of facial image 218 in the form of LBP histogram 306. The LBP histogram 306 pertaining to the facial image 218 is then normalized and stored as texture-based feature vector 308. Once the specular features 304 and texture-based feature vector 308 are generated, both feature vectors are then concatenated to form a final feature vector 226. The final feature vector 226 is further processed in order to detect whether to the liveness of the captured image. In one example, a classifier processes the final feature vector 226 to ascertain whether the image captured is of a live person or not.

Figure 4:
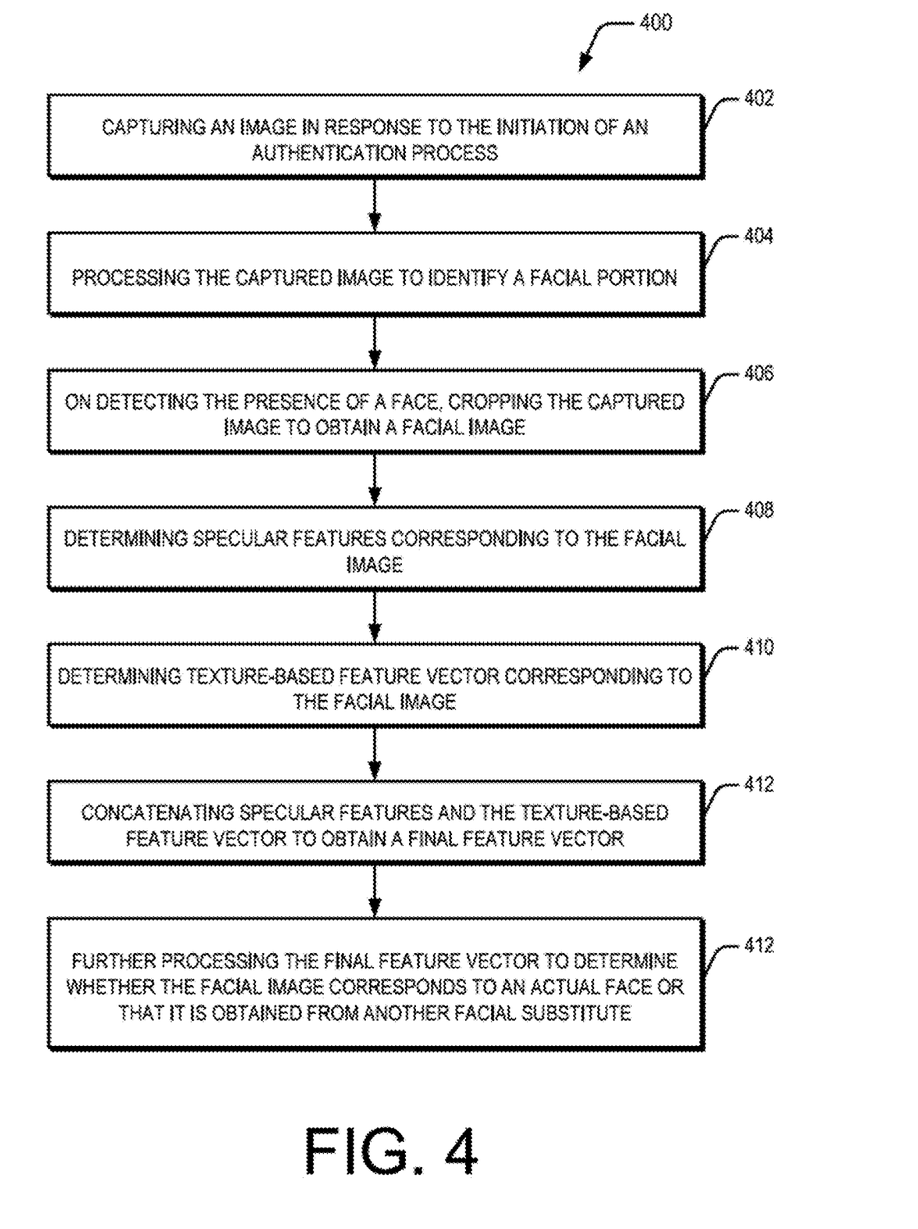
FIG. 4 is a flow diagram outlining the method for the face detection.

FIG. 4 illustrate example method 400, respectively, for ascertaining whether a facial image corresponds to an actual face of the user or whether it has been obtained from a facial substitute, according to an example of the present subject matter. The order in which the methods are described is not intended to be construed as a limitation, and any number of the described method blocks may be combined in any order to implement the aforementioned methods, or an alternative method. Furthermore, method 400 may be implemented by processing resource or computing device(s) through any suitable hardware, non-transitory machine-readable program instructions, or combination thereof, or through logical circuitry.

It may also be understood that method 400 may be performed by programmed and/or configured network devices present within a communication network, with such devices including the computing device 102 as depicted in FIGS. 1-2. Furthermore, in certain circumstances, program instructions stored in a non-transitory computer readable medium when executed may implement method 400 through the respective devices, as will be readily understood. The non-transitory computer readable medium may include, for example, digital memories, magnetic storage media, such as one or more magnetic disks and magnetic tapes, hard drives, or optically readable digital data storage media. Although, the method 400 are described below with reference to the computing device 102, as described above, other suitable systems for the execution of these methods can be utilized. Additionally, implementation of these methods is not limited to such examples At block 402, an image may be captured in response to the initiation of an authentication process. For example, once the authentication process is initiated, the image sensor(s) 208 may capture an image. The captured image may be stored within the computing device 102 as captured image 216. In an example, the captured image 216 may include a facial portion of the user. The facial portion may be either the actual face of the user 104 or may be from a facial substitute, e.g., a photograph.

At block 404, the captured image may be further processed to identify a facial portion. For example, the image analysis module 106 may process the captured image to identify the portion of image which includes a face of an individual, such as the user 104. The image analysis module 106 may identify the portion of the image which includes a face of the user 104 based on either edge detection technique or based on mechanisms which employ a support vector machine. Other approaches may also be employed without deviating from the scope of the present subject matter.

At block 406, on detecting the presence of a face, the captured image may be cropped to obtain a facial image. In addition, as part of pre-processing, the facial image may be further processed. For example, the image analysis module 106 may crop the captured image 216 may be cropped to isolate the portion which bears the face. The cropped image, stored as facial image 218, may be further processed before one or more features corresponding to the facial image 218 are determined. Thereafter, the facial image 218 may be aligned and scaled by detecting the position of the eyes within the facial image 218. Once the position of eyes is determined, the image analysis module 106 may provide a notional line passing through the eyes of the facial image 218, based on which the facial image 218 may be aligned. Thereafter, facial image 218 may be scaled and resized to a predefined size. In an example, the facial image 218 may be resized to a 128*128 RGB image.

At block 408, specular features corresponding to the facial image are determined. For example, the image analysis module 106 may further process the facial image 218 in order determine one or more specular features pertaining to the facial image 218. The image analysis module 106 may convert the facial image 218 to the YUV color space and may separate the Y channel corresponding to the facial image 218 in the YUV color space. The image analysis module 106 may then perform a histogram normalization onto the normalized Y channel of the facial image 218. The normalized Y channel may be further subjected to an intensity transformation function to provide a transformed Y channel value. Thereafter, the image analysis module 106 may subtract the transformed Y channel value from a corresponding normalized Y channel value which to obtain a series, which may then be collected into a 128-bin histogram to provide the specular features in the form of a specular reflection gradient histogram.

At block 410, texture-based feature vector corresponding to the facial image are determined. For example, the image analysis module 106 may further process the facial image 218 to determine one or more texture-based features. In an example, the image analysis module 106 may rely on a local binary pattern-based algorithm for determining the texture-based features. To this end, the image analysis module 106 may retrieve the facial image 218 and covert into a grayscale image. Once the grayscale version of the facial image 218 is obtained, the image analysis module 106 may apply a local binary pattern (LBP) function onto the grey-scaled facial image 218. As would be commonly understood, the LBP function when applied onto an image provide texture-based feature vector 224.

At block 412, the specular features and the texture-based feature vector are concatenated to obtain a final feature vector. For example, the image analysis module 106 may concatenate the specular features 222 and the specular features to obtain a final feature vector 226.

At block 414, the final feature vector may be further assessed by the image analysis module to determine whether the facial image corresponds to an actual face or that it is obtained from another facial substitute. For example, the image analysis module 106 may process the final feature vector 226 to determine whether the facial image 218 corresponds to an actual face or that it is obtained from another facial substitute of the user 104. In one example, the image analysis module 106 may rely on a support vector machine classifier for performing the assessment based on the specular features 222 and the texture-based feature vector 224. Thereafter, the authentication process may continue and the user 104 may be validated to ascertain whether access to the computing device 102 is to be provided or not.

Although examples for the present disclosure have been described in language specific to structural features and/or methods, it is to be understood that the appended claims are not necessarily limited to the specific features or methods described. Rather, the specific features and methods are disclosed and explained as examples of the present disclosure.

We claim:

1. A system comprising:
a processor;
an image analysis module coupled to the processor, wherein the image analysis module is to:
processing captured image to detect facial portion of a user within the captured image;
deriving a facial image from the processed captured image;
for the derived facial image, determining a set of specular features and texture-based feature vector, wherein for determining specular features, the image analysis module is to:
convert the facial image to a YUV color space to obtain a converted facial image; and
process the Y-channel of converted facial image to obtain the specular features, wherein the processing of the Y-channel further comprises:
normalizing the Y-channel;
performing a histogram normalization of the normalized Y-channel;
further performing an intensity transformation on the normalized Y-channel to obtain a transformed Y-channel; and
subtracting the transformed Y-channel from the corresponding normalized Y-channel to obtain the specular features,
concatenating the specular features and the texture-based feature vector to obtain a final feature vector; and
based on the final feature vector, ascertaining whether the facial image is of a facial substitute.

2. The system as claimed in claim 1, wherein the image analysis module to detect the facial portion of the user based on one of edge detection techniques and a support vector machine classifier.

3. The system as claimed in claim 1, wherein to derive the facial image from the processed captured image, the image analysis module is to:
cropping a portion of the captured image bearing the facial portion to obtain the facial image;
detecting pair of eyes within the facial image;
aligning the facial image with respect to a notional axis; and
resizing the facial image to a predefined size.

4. The system as claimed in claim 1, wherein for determining the texture-based feature vector, the image analysis module is to:
converting the facial image to grayscale facial image; and
obtaining the texture-based feature vector based on applying a local binary pattern (LBP) function onto the grayscale facial image.

5. The system as claimed in claim 4, wherein the applying the local binary pattern function further comprises:
for a cell comprising a predefined number of pixels of the facial image, applying the LBP function;
for a given cell, obtaining an LBP histogram based on the LBP function;
normalizing the LBP histogram; and
consolidating LBP histogram for all cells of the facial image to obtain the texture-based feature vector.

6. The system as claimed in claim 1, wherein the ascertaining whether the facial image is of a facial substitute based on the specular features and the texture-based feature vector is based on a support vector classifier applied onto the final feature vector.

7. The system as claimed in claim 1, wherein the captured image comprises one of a still image and a video stream.

8. A method comprising:
obtaining a captured image, wherein the captured image comprises a facial portion of a user;
processing the captured image to detect the facial portion of the user within the captured image;
generated a facial image from the processed captured image, wherein the facial image comprises the facial portion of the user;
for the generated facial image, determining a set of specular features and texture-based feature vector, wherein determining the set of specular features comprises:
converting the facial image to a YUV color space to obtain a converted facial image; and
processing the Y-channel of converted facial image to obtain the specular features, wherein the processing of the Y-channel further comprises:
normalizing the Y-channel;
performing a histogram normalization of the normalized Y-channel;
further performing an intensity transformation on the normalized Y-channel to obtain a transformed Y-channel; and
subtracting the transformed Y-channel from the corresponding normalized Y-channel to obtain the specular features,
concatenating the specular features and the texture-based feature vector to obtain a final set of feature vector; and
ascertaining whether the facial image corresponds to an actual face of the user based on the final set of feature vector.

9. The method as claimed in claim 8, wherein the captured image in an RGB format and is one of a still image and a video stream.

10. The method as claimed in claim 8, wherein generating the facial image comprises:
- cropping a portion of the captured image bearing the facial portion to obtain the facial image;
- aligning the facial image with respect to a notional axis based on detecting an angle of a notional line between eyes within the facial image with respect to the notional axis; and
- resizing the facial image to a predefined size.

11. The method as claimed in claim 8, wherein for determining the texture-based feature vector, the method further comprises:
- converting the facial image to grayscale facial image; and
- obtaining the texture-based feature vector based on applying a local binary pattern (LBP) function onto the grayscale facial image.

12. The method as claimed in claim 8, wherein the ascertaining whether the facial image corresponds to an actual face of the user based on the final set of feature vector is based on a support vector classifier.

* * * * *